(12) United States Patent　　　(10) Patent No.:　US 12,623,846 B2
　　　Wei　　　　　　　　　　　　　　　(45) Date of Patent:　　May 12, 2026

(54) SHUTTLE VEHICLE LEVEL-SWITCHING HOIST FOR STEREOSCOPIC WAREHOUSE AND SHUTTLE VEHICLE CONVEYING DEVICE

(71) Applicant: Beijing Jingdong Qianshi Technology Co., Ltd., Beijing (CN)

(72) Inventor: Xuguang Wei, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 605 days.

(21) Appl. No.: 18/041,204

(22) PCT Filed: Mar. 12, 2021

(86) PCT No.: PCT/CN2021/080358
　　§ 371 (c)(1),
　　(2) Date: Feb. 9, 2023

(87) PCT Pub. No.: WO2022/041683
　　PCT Pub. Date: Mar. 3, 2022

(65) Prior Publication Data
　　US 2023/0294919 A1　　Sep. 21, 2023

(30) Foreign Application Priority Data
　Aug. 25, 2020　(CN) .......................... 202010866574.2

(51) Int. Cl.
　*B65G 11/04*　　　(2006.01)
　*B65G 1/137*　　　(2006.01)
　*B65B 11/04*　　　(2006.01)
(52) U.S. Cl.
　CPC .......... *B65G 1/1375* (2013.01); *B65B 11/045* (2013.01)

(58) Field of Classification Search
　CPC .. B65G 1/1375; B65G 1/0492; B65G 1/0414; B65G 1/0428; B65B 11/045
　See application file for complete search history.

(56) References Cited

U.S. PATENT DOCUMENTS

| | | | |
|---|---|---|---|
| 8,827,619 | B2 | 9/2014 | Schafer |
| 2009/0129902 | A1 | 5/2009 | Schafer |
| 2017/0137221 | A1 | 5/2017 | Koide |

FOREIGN PATENT DOCUMENTS

| | | | | |
|---|---|---|---|---|
| CN | 1144870 | A | * 3/1997 | ............... E04H 6/22 |
| CN | 203714555 | | 7/2014 | |

(Continued)

OTHER PUBLICATIONS

Japanese Office Action, issued in the corresponding Japanese patent application No. 2023-509682, dated Feb. 27, 2024, 6 pages with machine translation.

(Continued)

*Primary Examiner* — Justin Holmes
(74) *Attorney, Agent, or Firm* — HSML P.C.

(57)　　　　　ABSTRACT

A shuttle vehicle level-switching hoist for a stereoscopic warehouse and a shuttle vehicle conveying device are provided. The shuttle vehicle level-switching hoist includes: a stereoscopic support frame and a vehicle carrying device for carrying the shuttle vehicle, the stereoscopic support frame is provided with a lifting driving member configured to drive the vehicle carrying device to move in a vertical direction; the vehicle carrying device is located in the stereoscopic support frame, and the vehicle carrying device includes: a main frame structure and a rotatable vehicle carrying structure arranged in the main frame structure. The hoist has both lifting and rotating functions, and may be suitable for the two-way shuttle vehicle. The arrangement of the matched stereoscopic shelf and laneway is relatively simple, and the article transportation of the two-way shuttle vehicle between (Continued)

different levels of the same stereoscopic shelf and between different stereoscopic shelves may be realized.

9 Claims, 7 Drawing Sheets

(56) References Cited

FOREIGN PATENT DOCUMENTS

| CN | 103362339 | B | * | 12/2016 |
|----|-----------|---|---|---------|
| CN | 106586357 | | | 4/2017 |
| CN | 207302229 | | | 5/2018 |
| CN | 108726061 | | | 11/2018 |
| CN | 108726070 | | | 11/2018 |
| CN | 109178758 | | | 1/2019 |
| CN | 208666180 | | | 3/2019 |
| CN | 209010082 | U | * | 6/2019 |
| CN | 209177442 | | | 7/2019 |
| CN | 209891787 | U | * | 1/2020 |
| CN | 112320178 | | | 2/2021 |

| DE | 102008016881 | 1/2010 |
|----|--------------|--------|
| FR | 2510981 | 2/1983 |
| JP | 61-8607 | 1/1986 |
| JP | 06-47206 | 6/1994 |
| JP | 2017-052592 | 3/2017 |
| WO | 2007/134840 | 11/2007 |

OTHER PUBLICATIONS

International Search Report and Written Opinion, issued in the corresponding PCT Application No. PCT/CN2021/080358, dated Jun. 23, 2021, 10 pages.
First Office Action, issued in the corresponding Chinese patent application No. 202010866574.2, dated Sep. 30, 2021, 18 pages.
Second Office Action, issued in the corresponding Chinese application No. 202010866574.2, dated Feb. 23, 2022, 16 pages.
Third Office Action, issued in the corresponding Chinese application No. 202010866574.2, dated Oct. 17, 2022, 17 pages.
Rejection decision, issued in the corresponding Chinese application No. 202010866574.2, dated Jun. 15, 2022, 6 pages.

* cited by examiner

SHUTTLE VEHICLE LEVEL-SWITCHING HOIST FOR STEREOSCOPIC WAREHOUSE AND SHUTTLE VEHICLE CONVEYING DEVICE

CROSS REFERENCE TO RELATED APPLICATION(S)

This application corresponds to PCT Application No. PCT/CN2021/080358, which claims priority to Chinese Application No. 202010866574.2, filed on Aug. 25, 2020 and entitled "SHUTTLE VEHICLE LEVEL-SWITCHING HOIST FOR STEREOSCOPIC WAREHOUSE AND SHUTTLE VEHICLE CONVEYING DEVICE", the contents of which are incorporated by reference in their entireties.

TECHNICAL FIELD

The present disclosure relates to a field of warehousing and logistics, in particular to a shuttle vehicle level-switching hoist for a stereoscopic warehouse and a shuttle vehicle conveying device.

BACKGROUND

A shuttle vehicle is an intelligent robot applied in the field of warehousing and logistics. Based on programming, the shuttle vehicle may perform tasks such as taking goods, transporting and placing, and may communicate with a host computer or a warehouse management system (WMS), and may realize the functions of automatic identification, goods placing and taking and the like in combination with identification technologies such as radio frequency identification (RFID) and bar code identification. In the daily warehousing logistics, goods taking and placing based on the shuttle vehicle has gradually become normalized. However, there are at least following problems in the existing technologies: the existing shuttle vehicle hoist is suitable for a four-way shuttle vehicle, that is, the shuttle vehicle that may move in both left-right direction and front-back direction; the hoist may only lift the shuttle vehicle in a vertical direction; due to a high cost of the four-way shuttle vehicle, the corresponding arrangement of the matched shelf and laneway is also relatively complex; for example, the laneway must be provided with an intersection. Therefore, it is necessary to propose a hoist that may be used for two-way shuttle vehicle, and the hoist has both lifting and rotating functions.

SUMMARY

In view of the above, the present disclosure provides a shuttle vehicle level-switching hoist for a stereoscopic warehouse and a shuttle vehicle conveying device.

One aspect of the present disclosure provides a shuttle vehicle level-switching hoist for a stereoscopic warehouse. The shuttle vehicle level-switching hoist includes: a stereoscopic support frame and a vehicle carrying device for carrying the shuttle vehicle. The stereoscopic support frame is provided with a lifting driving member configured to drive the vehicle carrying device to move in a vertical direction; the vehicle carrying device is located in the stereoscopic support frame, and the vehicle carrying device includes a main frame structure and a rotatable vehicle carrying structure arranged in the main frame structure. According to embodiments of the present disclosure, a support member is arranged in the main frame structure; and the rotatable vehicle carrying structure includes: a rotary disc arranged on the support member; a rotation driving member arranged on the support member and configured to drive the rotary disc to rotate; and a vehicle carrying part arranged on the rotary disc and configured to carry the shuttle vehicle.

According to embodiments of the present disclosure, the vehicle carrying part includes: an intermediate support member and a vehicle carrying frame. The intermediate support member is fixed on the rotary disc, the intermediate support member is provided with a displacement driving component and a first guide structure. The vehicle carrying frame is configured to place the shuttle vehicle, the vehicle carrying frame is provided with a moving part matched with the first guide structure, and the displacement driving component is configured to drive the vehicle carrying frame to move in an extension direction of the first guide structure.

According to embodiments of the present disclosure, the vehicle carrying frame is further provided with a second guide structure matched with a wheel of the shuttle vehicle, and an extension direction of the second guide structure is the same as the extension direction of the first guide structure.

According to embodiments of the present disclosure, a side edge of the vehicle carrying frame in the extension direction of the first guide structure is further provided with a wing plate.

According to embodiments of the present disclosure, a top corner of the main frame structure is provided with a guide wheel for fitting with the stereoscopic support frame in the vertical direction, so as to limit the vehicle carrying device to move in the vertical direction along the main frame structure.

According to embodiments of the present disclosure, an opening is arranged on the intermediate support member at a position other than a position where the displacement driving component is arranged, the opening being for reducing a weight of the vehicle carrying device while ensuring a strength.

According to embodiments of the present disclosure, the main frame structure includes a peripheral frame and a support beam arranged on a top plane of the peripheral frame, and the support beam is configured to enhance a structural strength and protect an internal structure from being impacted by a foreign object.

According to embodiments of the present disclosure, the shuttle vehicle is a two-way shuttle vehicle, and the two-way shuttle vehicle is a shuttle vehicle moving in two opposite directions along a same straight line.

According to another aspect of the present disclosure, there is provided a shuttle vehicle conveying device, including: at least two shuttle vehicle level-switching hoists described above, a transverse track arranged between two adjacent shuttle vehicle level-switching hoists in the at least two shuttle vehicle level-switching hoists for the shuttle vehicle to move between the adjacent shuttle vehicle level-switching hoists. The at least two shuttle vehicle level-switching hoists are configured to be provided at edges of laneways of stereoscopic shelves, and the shuttle vehicle transports an article between different levels of a same stereoscopic shelf and between different stereoscopic shelves based on a lifting and rotation of the shuttle vehicle by the shuttle vehicle level-switching hoists.

According to embodiments of the present disclosure, the lifting driving member may drive the vehicle carrying device to move in the vertical direction, the vehicle carrying structure in the vehicle carrying device is rotatable in the main frame and has both lifting and rotating functions. When the vehicle carrying structure carries the shuttle vehicle, the shuttle vehicle may change a height in the vertical direction along with the vehicle carrying device and may also rotate and change direction along with the vehicle carrying structure, and problems of high cost and complex arrangement of the matched shelf and laneway due to the fact that the existing hoister is only suitable for the four-way shuttle vehicle may be at least partially solved. The hoist has both lifting and rotating functions, and may be suitable for the two-way shuttle vehicle. The arrangement of the matched stereoscopic shelf and laneway is relatively simple, and the article transportation of the two-way shuttle vehicle between different levels of the same stereoscopic shelf and between different stereoscopic shelves may be realized.

BRIEF DESCRIPTION OF THE DRAWINGS

The above and other objectives, features and advantages of the present disclosure will be more apparent through the following description of embodiments of the present disclosure with reference to the accompanying drawings.

DETAILED DESCRIPTION OF EMBODIMENTS

Figure 1:
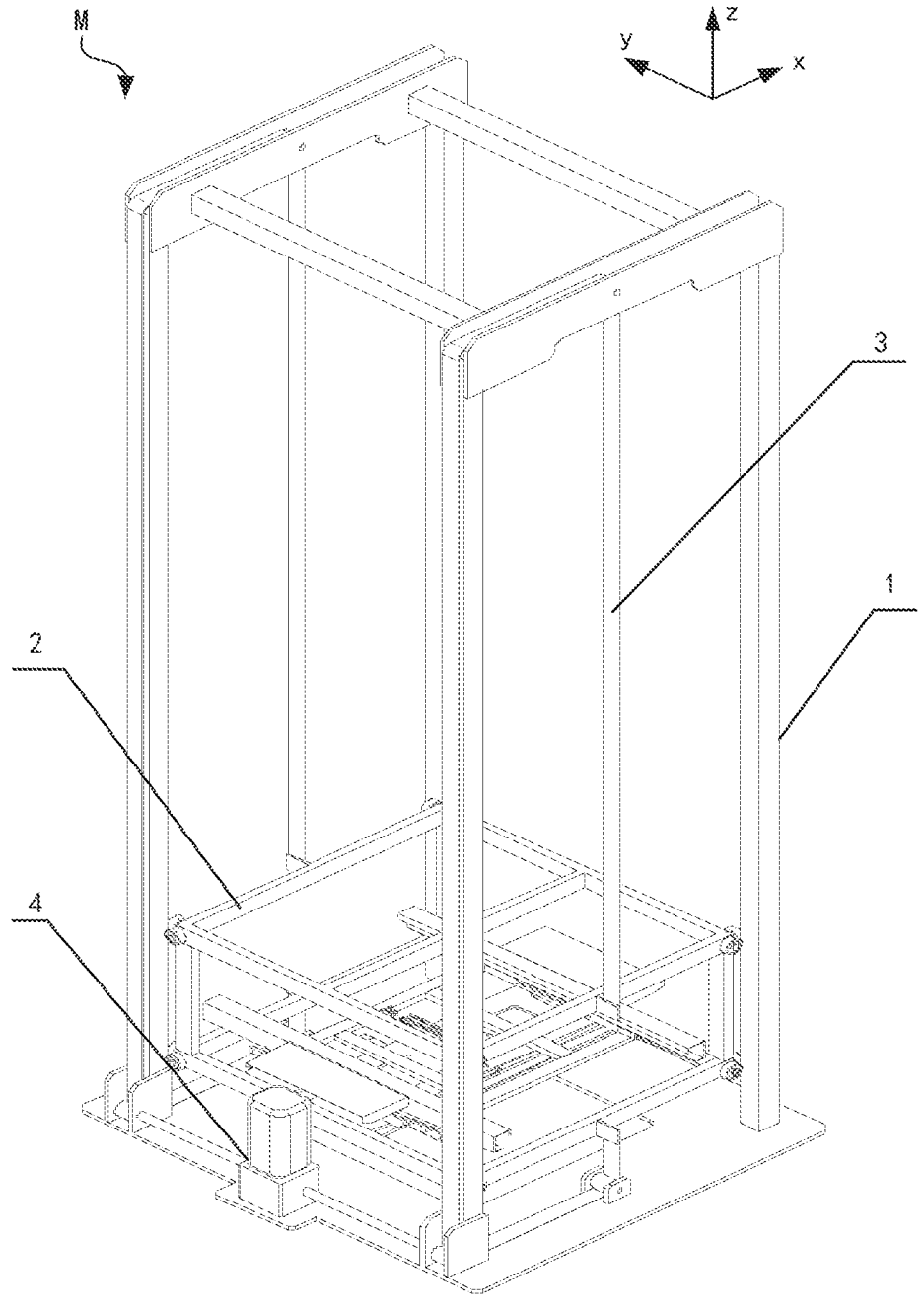
FIG. 1 schematically shows a three-dimensional structure diagram of a shuttle vehicle level-switching hoist for a stereoscopic warehouse according to embodiments of the present disclosure.

Embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of embodiments of the present disclosure. It is obvious, however, that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms "comprising", "including" and the like used herein specify a presence of the feature, step, operation and/or component, but do not preclude a presence or addition of one or more other features, steps, operations or components.

All terms (including technical and scientific terms) used herein have the same meaning as commonly understood by those of ordinary skill in the art, unless otherwise defined. It should be noted that the terms used herein should be construed to have meanings consistent with the context of the present description and should not be construed in an idealized or overly rigid manner.

The use of "first", "second" and the like in the description of embodiments of the present disclosure is not intended to indicate any order, quantity or importance, but rather is used to distinguish different components. Terms "connection" or "link" and the like are not restricted to a physical or mechanical connection, but may include an electrical connection, whether direct or indirect. Directional terms "upper", "lower", "left", "right", "top", "bottom", and the like are merely used to denote relative positional relationships. When an absolute position of the described object changes, a relative position relationship may also change accordingly. It will be understood that when an element such as a layer, film, region or component is referred to as being "on" or "under" another element, it may be "directly on" or "directly under" the another element or an intervening element may be present. In the accompanying drawings of the present disclosure, the coordinate systems of all figures are consistent.

Embodiments of the present disclosure provide a shuttle vehicle level-switching hoist for a stereoscopic warehouse and a shuttle vehicle conveying device. The shuttle vehicle level-switching hoist for a stereoscopic warehouse has both lifting and rotating functions, which may be suitable to a two-way shuttle vehicle. The arrangement of the matched stereoscopic shelf and laneway is relatively simple, and the article transportation of the two-way shuttle vehicle between different levels of the same stereoscopic shelf and between different stereoscopic shelves may be realized.

The shuttle vehicle level-switching hoist for a stereoscopic warehouse according to embodiments of the present disclosure includes a stereoscopic support frame and a vehicle carrying device for carrying the shuttle vehicle, wherein the stereoscopic support frame is provided with a lifting driving member configured to drive the vehicle carrying device to move in a vertical direction. The vehicle carrying device is located in the stereoscopic support frame, and the vehicle carrying device includes a main frame structure and a rotatable vehicle carrying structure arranged in the main frame structure. The lifting driving member may drive the vehicle carrying device to move in the vertical direction. In the vehicle carrying device, the vehicle carrying structure is rotatable in the main frame, and has both lifting and rotating functions.

A first exemplary embodiment of the present disclosure provides a shuttle vehicle level-switching hoist for a stereoscopic warehouse, which has both a lifting function and a rotating function for a shuttle vehicle.

The shuttle vehicle level-switching hoist for a stereoscopic warehouse of the present disclosure may be suitable for the two-way shuttle vehicle, and the two-way shuttle vehicle is a shuttle vehicle moving in two opposite directions along a same straight line. For example, in the coordinate system of FIG. 1 of the present disclosure, the two-way shuttle may move in positive and negative (front and back) directions of x or positive and negative (left and right) directions of y. Based on a matching use of the two-way shuttle vehicle and the hoist in the embodiment, problems of high cost and complex arrangement of the matched shelf and laneway caused by the fact that the existing hoist is only suitable for the four-way shuttle vehicle may be at least partially solved.

Certainly, the hoist of the present disclosure is further suitable for other types of shuttle vehicles, such as the four-way shuttle vehicle. The hoist of the present disclosure extends the scope of application of the shuttle vehicles.

Figure 2:
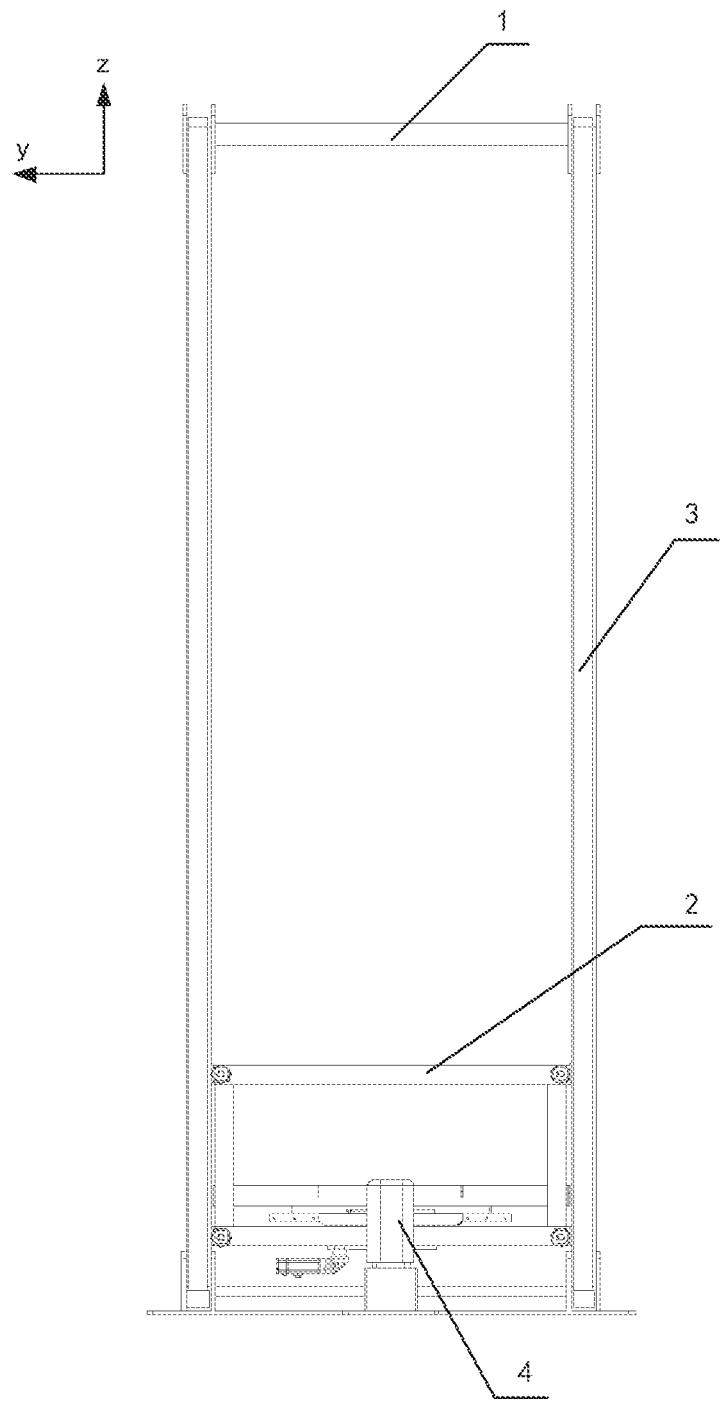
FIG. 2 schematically shows a front view of the shuttle vehicle level-switching hoist for a stereoscopic warehouse as shown in FIG. 1.

FIG. 1 schematically shows a three-dimensional structure diagram of a shuttle vehicle level-switching hoist for a stereoscopic warehouse according to embodiments of the present disclosure. FIG. 2 schematically shows a front view of the shuttle vehicle level-switching hoist for a stereoscopic warehouse as shown in FIG. 1.

As shown in FIG. 1 and FIG. 2, a shuttle vehicle level-switching hoist M for a stereoscopic warehouse in the present disclosure includes a stereoscopic support frame 1 and a vehicle carrying device 2 for carrying the shuttle vehicle. The stereoscopic support frame 1 is provided with a lifting driving member 4 which is used to drive the vehicle carrying device 2 to move in the vertical direction. The vehicle carrying device 2 is located in the stereoscopic support frame 1. The vehicle carrying device 2 includes a main frame structure and a rotatable vehicle carrying structure arranged in the main frame structure.

According to embodiments of the present disclosure, as shown in FIG. 1 and FIG. 2, the stereoscopic support frame 1 serves as the support frame of the hoist M, and includes: a base plate, four columns arranged on the base plate, two parallel prisms connected between a top of two groups of columns in the four columns, and a beam fixed between the two prisms. Certainly, the structure of the stereoscopic support frame here is only an example, and is not intended to limit the scope of protection. Other frame structures capable of supporting are within the scope of protection of the present disclosure.

The stereoscopic support frame 1 is provided with a lifting driving member 4 which may be a device or structure providing power for the lifting of the rotatable vehicle platform 2. According to embodiments of the present disclosure, the lifting driving member 4 is a servo motor. Based on the servo motor, a received electrical signal may be converted into angular displacement or angular velocity on a motor shaft for output to drive a control object, which has characteristics of small electromechanical time constant, high linearity, breakaway voltage and so on.

Figure 3:
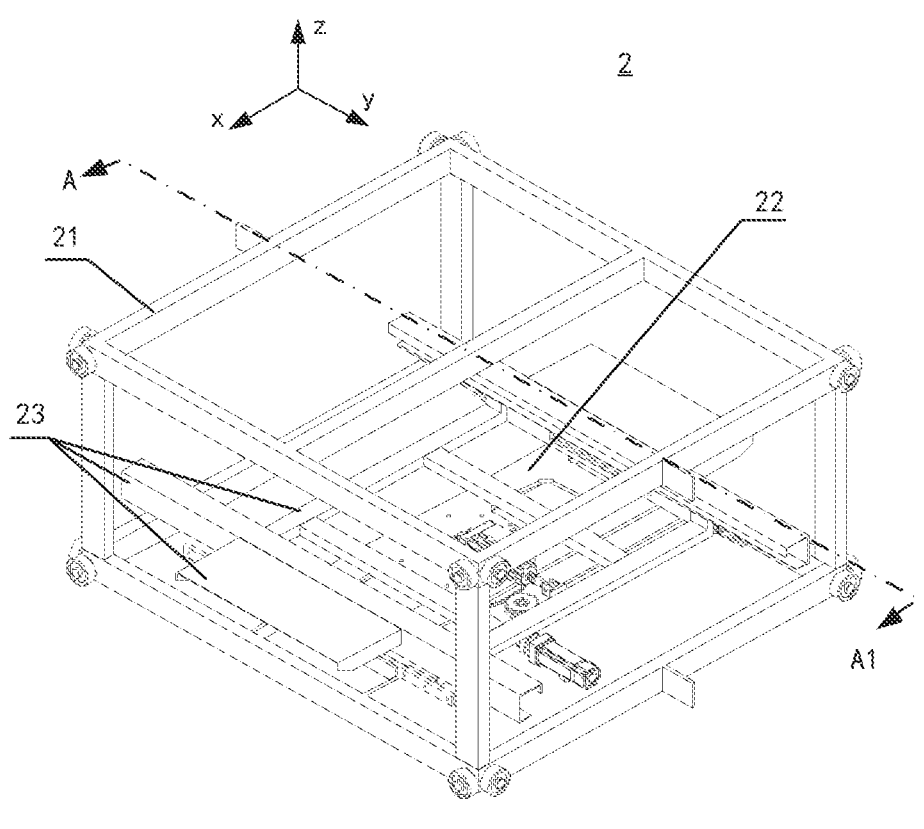
FIG. 3 schematically shows a three-dimensional structure diagram of a vehicle carrying device according to embodiments of the present disclosure.
Figure 5:
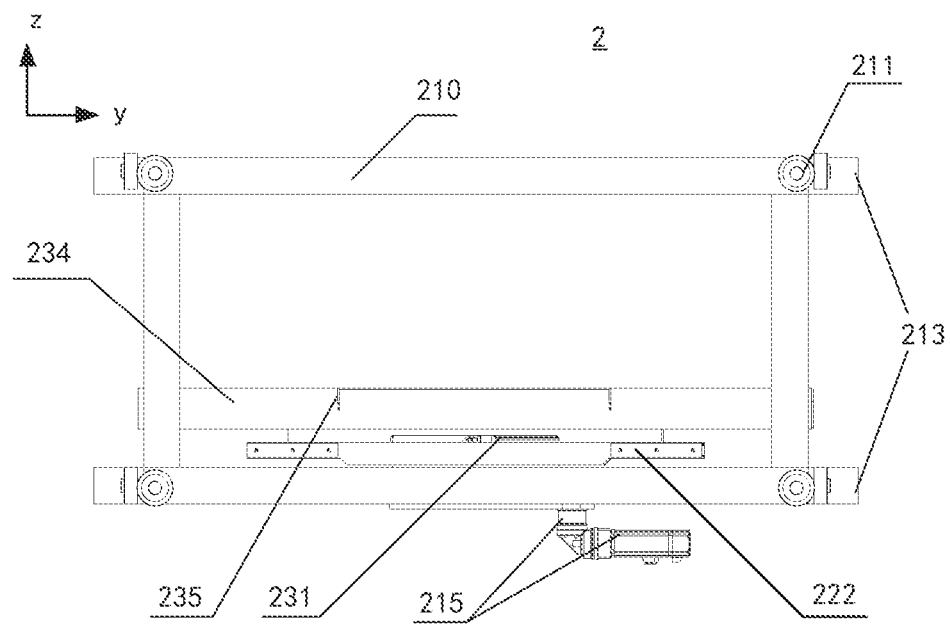
FIG. 5 schematically shows a front view of the vehicle carrying device as shown in FIG. 3.

As shown in FIG. 1 and FIG. 2, a transmission member 3 is connected between the vehicle carrying device 2 and the lifting driving member 4. According to embodiments of the present disclosure, the transmission member 3 may be a synchronous belt. As shown in FIG. 1 and FIG. 2, the synchronous belt is connected between the vehicle carrying device 2 and the lifting driving member 4. Specifically, as shown in FIG. 1, FIG. 3 and FIG. 5, two ends of the synchronous belt are respectively fixed on a transmission member connecting part 213 distributed on upper and lower parts of an outer side of a frame body 210 of the main frame structure in the vehicle carrying device 2. The synchronous belt extends from one end fixed with the transmission member connecting part 213 above the vehicle carrying device 2 to the stereoscopic support frame 1, and extends along the prism, the column of the stereoscopic support frame 1 and a first rotating shaft arranged on the base plate. A second rotating shaft is further provided on the base plate, and a position of the second rotating shaft corresponds to a position of the transmission member connecting part 213 under the vehicle carrying device. The synchronous belt may be connected to the transmission member connecting part 213 below the vehicle carrying device along the first rotating shaft, through the base plate and around the second rotating shaft. The servo motor as an example of the lifting driving member 4 is used to drive the first rotating shaft. Under a driving action of the servo motor, the synchronous belt as an example of the transmission member 3 will perform transmission at a predetermined speed, so as to drive the vehicle carrying device 2 to move in the vertical direction (z direction). Based on the drive of the lifting driving member 4 and the transmission of the transmission member 3, the vehicle carrying device 2 may move in the vertical direction.

The above-mentioned description of the transmission member is provided as an exemplary manner, and other structures capable of performing the transmission are within the scope of protection of the present disclosure.

Various components of the vehicle carrying device are described in detail below in combination with FIG. 3 and FIG. 10.

Figure 4:
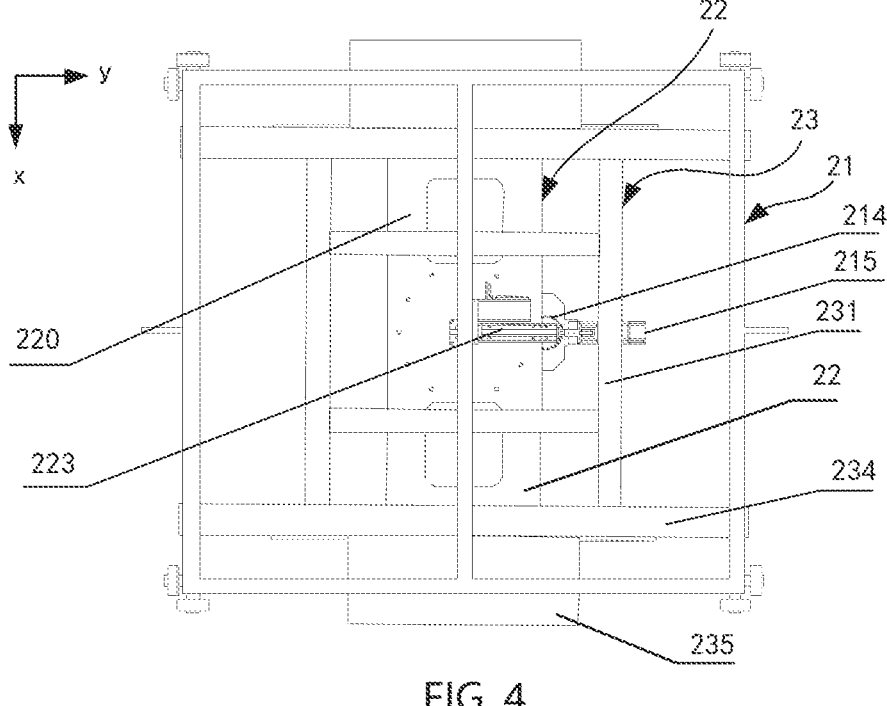
FIG. 4 schematically shows a top view of the vehicle carrying device as shown in FIG. 3.
Figure 6:
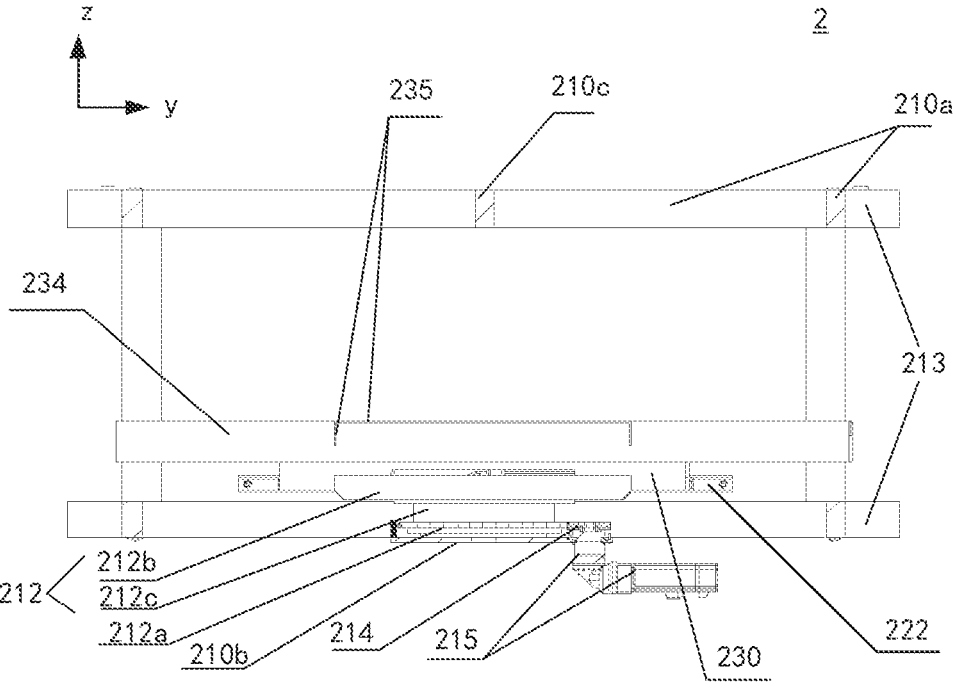
FIG. 6 schematically shows a sectional view of the vehicle carrying device as shown in FIG. 3 along line A-A1.
Figure 7:
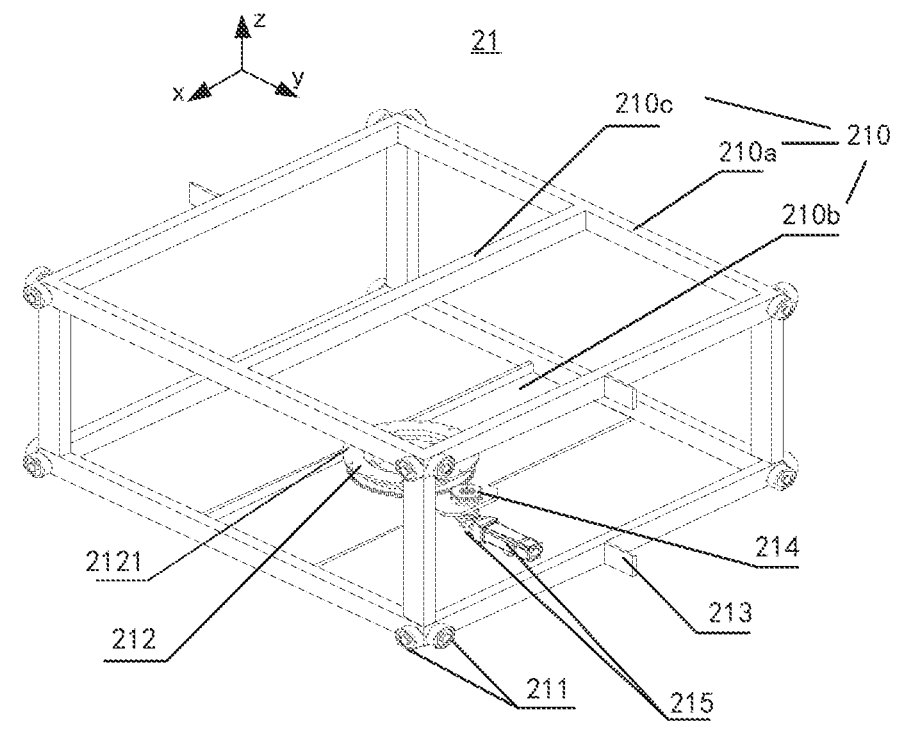
FIG. 7 schematically shows a three-dimensional structure diagram of a main frame structure, a rotary disc and a rotation driving member of a vehicle carrying device according to embodiments of the present disclosure.
Figure 8:
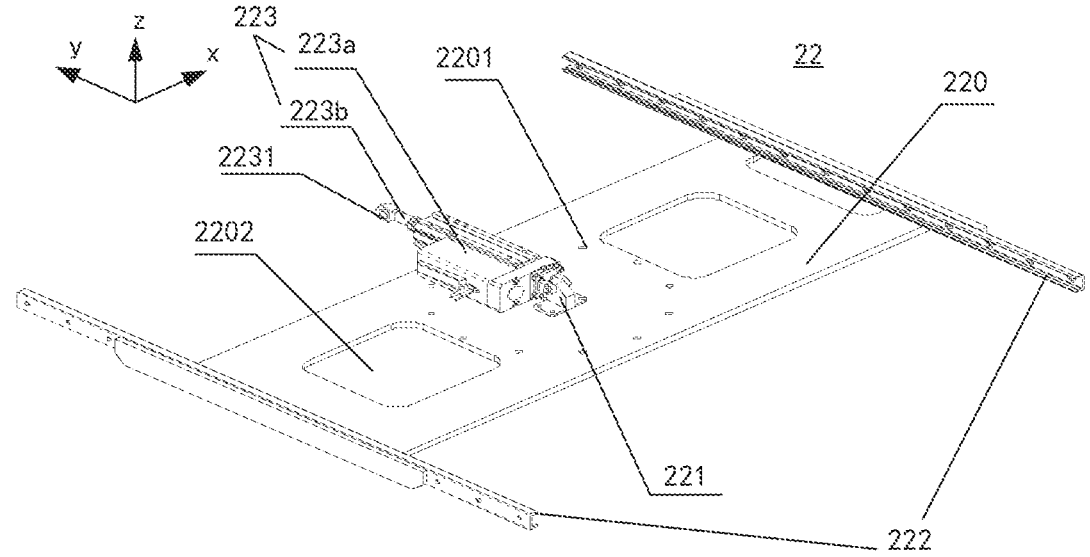
FIG. 8 schematically shows a three-dimensional structure diagram of an intermediate support member of a vehicle carrying part according to embodiments of the present disclosure.
Figure 9:
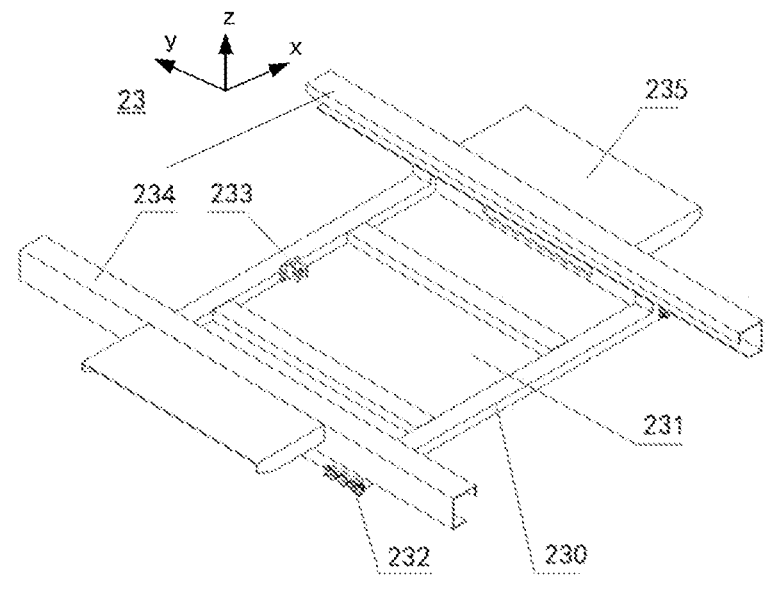
FIG. 9 schematically shows a three-dimensional structure diagram of a vehicle carrying frame of a vehicle carrying part according to embodiments of the present disclosure.

FIG. 3 schematically shows a three-dimensional structure diagram of a vehicle carrying device according to embodiments of the present disclosure. FIG. 4 schematically shows a top view of the vehicle carrying device as shown in FIG. 3. FIG. 5 schematically shows a front view of the vehicle carrying device as shown in FIG. 3. FIG. 6 schematically shows a sectional view of the vehicle carrying device as shown in FIG. 3 along line A-A1. FIG. 7 schematically shows a three-dimensional structure diagram of a main frame structure, a rotary disc and a rotation driving member of a vehicle carrying device according to embodiments of the present disclosure. FIG. 8 schematically shows a three-dimensional structure diagram of an intermediate support member of a vehicle carrying part according to embodiments of the present disclosure. FIG. 9 schematically shows a three-dimensional structure diagram of a vehicle carrying frame of a vehicle carrying part according to embodiments of the present disclosure. FIG. 10 schematically shows a three-dimensional structure diagram of a vehicle carrying device along line A-A1 according to embodiments of the present disclosure.

As shown in FIG. 3 to FIG. 5, according to embodiments of the present disclosure, the vehicle carrying device 2 includes: a main frame structure 21 and a rotatable vehicle carrying structure arranged in the main frame structure 21.

According to embodiments of the present disclosure, as shown in FIG. 6 and FIG. 7, a support member 210*b* is arranged in the main frame structure 21. As shown in FIG. 7 to FIG. 9, the rotatable vehicle carrying structure includes: a rotary disc 212 arranged on the support member 210*b*; a rotation driving member arranged on the support member 210*b* used to drive the rotary disc to rotate; and a vehicle carrying part arranged on the rotary disc 212 to carry the shuttle vehicle.

According to embodiments of the present disclosure, as shown in FIG. 8 and FIG. 9, the vehicle carrying part includes: an intermediate support member 22 and a vehicle carrying frame 23. The intermediate support member 22 is fixed on the rotary disc 212, the intermediate support member 22 is provided with a displacement driving component 223 and a first guide structure 222, the vehicle carrying frame 23 is used to place the shuttle vehicle, the vehicle carrying frame 23 is provided with a moving part 232 matched with the first guide structure 222, and the displacement driving component 223 is used to drive the vehicle carrying frame 23 to move in an extension direction of the first guide structure 222.

According to embodiments of the present disclosure, as shown in FIG. 9, the vehicle carrying frame 23 is further provided with a second guide structure 234 matched with a wheel of the shuttle vehicle, and an extension direction of the second guide structure 234 is the same as the extension direction of the first guide structure 222.

In an embodiment, as shown in FIG. 6 and FIG. 7, the main frame structure 21 includes a frame body 210. The frame body 210 includes a peripheral frame 210*a* and a support member 210*b* arranged on a bottom plane of the peripheral frame 210*a*.

According to embodiments of the present disclosure, the frame body 210 further includes a support beam 210*c* arranged on a top plane of the peripheral frame 210*a*, and the support beam 210*c* is used to enhance a structural strength and protect an internal structure from an impact of a foreign object.

According to embodiments of the present disclosure, the peripheral frame 210*a* is a cube frame with a total of 12 edges. The peripheral frame 210*a* defines the space for the placement and rotation of the vehicle carrying structure. In a top view of the peripheral frame 210*a*, dimensions of length (y direction) and width (x direction) need to meet the placement and rotation of the vehicle carrying structure.

A plane where the support member 210*b* is located may be adjusted according to actual needs. The above-mentioned embodiment is intended only as an exemplary embodiment.

The rotary disc 212 is arranged on the support member 210*b*, and rotates in the horizontal plane under the driving effect of the rotation driving member and drives the vehicle carrying part to rotate.

According to embodiments of the present disclosure, as shown in FIG. 7, the main frame structure 21 further includes a transmission member connecting part 213 used to connect with the transmission member 3, and the transmission member connecting part 213 is symmetrically distributed on an outer side of the frame body 210. For example, two groups of transmission member connecting parts 213 illustrated in FIG. 7 are symmetrically arranged (along y direction) on four edges distributed along the x-axis of the peripheral frame 210*a*, and each group transmission member connecting part 213 is arranged in the middle portion of the two up-down parallel edges. The symmetrically distributed transmission member connecting part 213 helps to ensure that the main frame structure 21 does not wobble or deflect during movement in the vertical direction based on the driving of the lifting driving member 4 and the transmission of the transmission member 3.

According to embodiments of the present disclosure, a top corner of the main frame structure 21 is further provided with a guide wheel 211. Specifically, as shown in FIG. 5 and FIG. 7, a top corner of the peripheral frame 210*a* is provided with the guide wheel 211. The above-mentioned guide wheel 211 is used for fitting (such as clamping) with a vertical part (column) of the stereoscopic support frame 1, so that the vehicle carrying device 2 moves along the vertical part (column) of the stereoscopic support frame 1. A moving direction and a track of the vehicle carrying device 2 are limited, so that the vehicle carrying device 2 may move stably.

According to embodiments of the present disclosure, the driving form of the rotation driving member and the corresponding transmission form may be the forms of motor+gear transmission or motor+synchronous belt transmission. The following is an example of motor+gear transmission.

According to embodiments of the present disclosure, as shown in FIG. 6 and FIG. 7, the rotation driving member includes: a servo motor reducer composite structure 215 and a driving gear 214. The servo motor reducer composite structure 215 is arranged below the support member 210*b*. The driving gear 214 is arranged above the support member 210*b*.

The servo motor reducer composite structure 215 is a composite structure in which a servo motor and a reducer are axially connected.

As shown FIG. 6 and FIG. 7, the rotary disc 212 includes: a driven gear 212*a*, a shaft column 212*c* and a tray 212*b*, and the driven gear 212*a* is connected with the tray 212*b* through the shaft column 212*c*.

As shown in FIG. 6, FIG. 7 and FIG. 0, a shaft of the driving gear 214 is connected with a shaft of the servo motor reducer composite structure 215. The driving gear 214 is engaged with the driven gear 212*a* at the bottom of the rotary disc 212. The driving of the servo motor reducer composite structure 215 rotates the driving gear 214 and drives the tray 212*b* on the rotary disc 212 to rotate. The rotary disc 212 rotates in the horizontal plane under the driving effect of the rotation driving member, and drives the vehicle carrying part fixed on the rotary disc structure 212 to rotate.

According to embodiments of the present disclosure, as shown in FIG. 3 and FIG. 8, the vehicle carrying part includes: an intermediate support member 22 and a vehicle carrying frame 23.

The intermediate support member 22 is fixed on the rotary disc 212, and the intermediate support member 22 is provided with a displacement driving component 223 and a first guide structure 222. The above-mentioned vehicle carrying frame 23 is used for placing the shuttle vehicle. The vehicle carrying frame 23 is provided with a moving part 232 matched with the first guide structure 222. The displacement driving component 223 is used to drive the vehicle carrying frame 23 to move in an extension direction of the first guide structure 222.

In an embodiment, as shown in FIG. 8, the intermediate support member 22 includes: a support body 220, a displacement driving component 223, and a first guide structure 222. The displacement driving component 223 is arranged on a support plate 220. The displacement driving component 223 includes a fixed part 223*a* and a movable part 223*b* that may move relative to the fixed part 223*a* under the action of self-driving. The first guide structure 222 may be in a form of guide rail. The first guide structure 222 is arranged on both sides of the support body 220. The extension direction of the first guide structure 222 is consistent with a position movement direction of the movable part 223*b* of the displacement driving component 223.

In an embodiment, the displacement driving component 223 may be an electric cylinder, an air cylinder or other type of device or structure with a fixed part and a movable part that moves under the action of self-driving.

According to embodiments of the present disclosure, the intermediate support member 22 further includes a support base 221 arranged on the support body 220. The above-mentioned support base 221 is used to connect the displace- ment driving component 223 and the support body 220. The fixed part 223a of the displacement driving component 223 is fixed on the support body 220 by connecting the support base 221 with the fixed part 223a of the displacement driving component 223, and there is a gap between the movable part 223b of the displacement driving component 223 and an upper surface of the support body 220, so as to meet the movement of the movable part 223b.

According to embodiments of the present disclosure, the above-mentioned support base 221 includes a base and an angled structure located above the base. The angled structure extends in radian from a plane where the base is located. An end portion of the angled structure of the support base 221 is connected with the fixed part 223a of the displacement driving component 223.

According to embodiments of the present disclosure, as shown in FIG. 3 and FIG. 9, the vehicle carrying frame 23 includes: a vehicle carrying support frame 230 and a moving part 232. The vehicle carrying support frame 230 defines a space 231 for accommodating the displacement driving component 223. The vehicle carrying support frame 230 is a quadrilateral frame. In order to improve a structural strength of the vehicle carrying support frame, a cross beam is provided inside the quadrilateral frame. The arrangement position and number of the cross beam and the spacing between a plurality of cross beams should meet the require- ments of the above-mentioned space 231, so that after the vehicle carrying frame 23 and the intermediate support member 22 are assembled, the above-mentioned space 231 may accommodate the displacement driving component 223. In an embodiment, the above-mentioned moving part 232 may be a roller set.

According to embodiments of the present disclosure, the vehicle carrying frame 23 is further provided with a second guide structure 234 matched with a wheel of the shuttle vehicle, and an extension direction of the second guide structure 234 is the same as the extension direction of the first guide structure 222.

An assembly relationship between the vehicle carrying frame 23 and the intermediate support member 22 is described in combination with FIG. 8 and FIG. 9. As shown in FIG. 8 and FIG. 9, a second assembly part 233 is arranged on an inner side of the vehicle carrying support frame 230, as shown in FIG. 9. A first assembly part 2231 is arranged at an end portion of the movable part 223b, as shown in FIG. 8. The vehicle carrying support frame 230 is connected with the movable part 223b of the displacement driving compo- nent 223; for example, the connection may be achieved through an assembly between the first assembly part 2231 and the second assembly part 233; the two may be assembled by a pin connection, a bolt connection, a screw connection or other connection methods, and the pin con- nection mode is exemplified in FIG. 8 and FIG. 9. As shown in FIG. 9, the moving part 232 is arranged on a side wall of the vehicle carrying support frame 230. Here, the moving part 232 being located on an outer side wall of the vehicle carrying support frame 230 is taken as an example. Exem- plarily, the moving part 232 is a roller set, and the first guide structure 222 is a guide rail. In other examples, forms in which the moving part 232 may match the first guide structure 222 are all within the scope of protection of the present disclosure. The layout direction of rollers in the roller set is consistent with the first guide structure 222, and the moving part 232 is used for assembling with the first guide structure 222.

Figure 10:
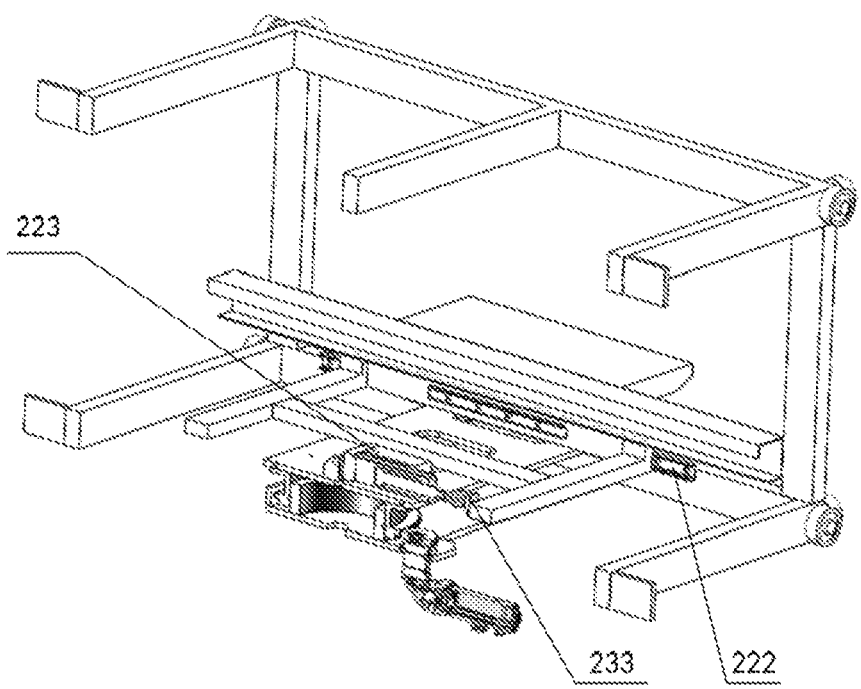
FIG. 10 schematically shows a three-dimensional structure diagram of a vehicle carrying device along line A-A1 according to embodiments of the present disclosure.

As shown in FIG. 8, FIG. 9 and FIG. 10, under the driving action of the displacement driving component 223, the movable part 223b moves relative to the fixed part 223a, and based on the connection between the first assembly part 2231 of the movable part 223b and the second assembly part 233 of the vehicle carrying support frame 230, the vehicle carrying frame 23 may be driven to move. Based on the cooperation between the moving part 232 and the first guide structure 222, the vehicle carrying device 23 may move in a direction defined by the first guide structure 222.

As shown in FIG. 9, FIG. 5 and FIG. 6, the second guide structure 234 is fixed above the vehicle carrying support frame 230. After the moving part 232 is assembled with the first guide structure 222, the moving part 232 in the views of FIG. 5 and FIG. 6 is located on an inner side the first guide structure 222, thus a blocked portion is not shown. In the view of FIG. 5, the moving part 232 is blocked by the first guide structure 222, and in the view of FIG. 6, the moving part 232 is blocked by the vehicle carrying support frame 230.

According to embodiments of the present disclosure, as shown in FIG. 7 and FIG. 8, a second support plate 220 is provided with an assembly hole for assembling with the rotary disc structure, which is described as a second assem- bly hole 2201 in FIG. 8. In FIG. 7, an upper surface of the rotary disc 212 is provided with a first assembly hole 2121, and a position of the first assembly hole 2121 corresponds to a position of the second assembly hole 2201. Based on the first assembly hole 2121 and the second assembly hole 2201, the assembly fixation of the rotary disc 212 and the support body 220 is realized, so as to realize the fixation of the rotary disc 212 and the vehicle carrying part, so that the vehicle carrying part may rotate with the rotary disc 212. In an embodiment, the first assembly hole 2121 and the second assembly hole 2201 are in annular distribution.

According to embodiments of the present disclosure, as shown in FIG. 8, an opening 2202 is arranged on an intermediate support member 22 at a position other than the position where the displacement driving component 223 is located. The above-mentioned opening 2202 is used to reduce a weight of the vehicle carrying device 2 while ensuring a strength. For example, at least one side (such as the left or right side, or both sides) of the second assembly hole 2201 on the support plate 220 is provided with the opening 2202.

According to embodiments of the present disclosure, as shown in FIG. 9, the vehicle carrying frame 23 further includes a wing plate 235 arranged on an outer side of the second guide structure 234. The arrangement of the above- mentioned wing plate 235 helps to avoid a problem that the shuttle vehicle is easy to fall down due to a tilt of an article when transporting the article.

In summary, the embodiment provides a shuttle vehicle level-switching hoist for a stereoscopic warehouse. The lifting driving member may drive the vehicle carrying device to move in the vertical direction, the vehicle carrying structure in the vehicle carrying device is rotatable in the main frame and has both lifting and rotating functions. When the vehicle carrying structure carries the shuttle vehicle, the shuttle vehicle may change a height in the vertical direction along with the vehicle carrying device and may also rotate and change direction along with the vehicle carrying structure, and problems of high cost and complex arrangement of the matched shelf and laneway due to the fact that the existing hoister is only suitable for the four-way shuttle vehicle may be at least partially solved. The hoist has both lifting and rotating functions, and may be suitable for the two-way shuttle vehicle. The arrangement of the matched stereoscopic shelf and laneway is relatively simple, and the article transportation of the two-way shuttle vehicle between different levels of the same stereoscopic shelf and between different stereoscopic shelves may be realized.

The second exemplary embodiment of the present disclosure provides a shuttle vehicle conveying device.

Figure 11:
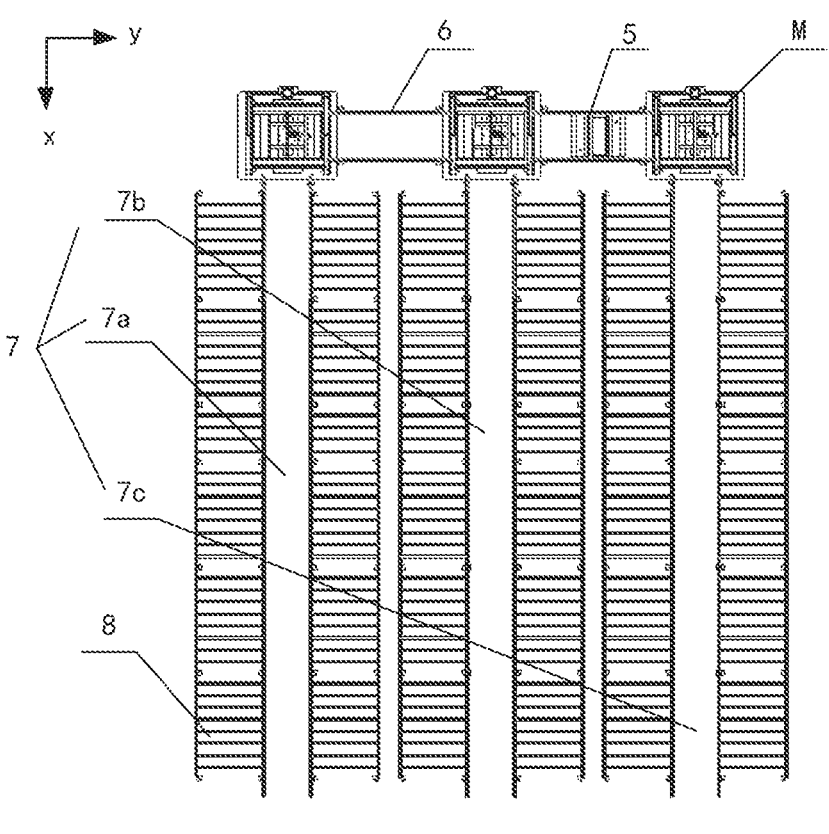
FIG. 11 schematically shows a top view structure diagram of a shuttle vehicle conveying device mated with a stereoscopic shelf according to embodiments of the present disclosure.

FIG. 11 schematically shows a top view structure diagram of a shuttle vehicle conveying device mated with a stereoscopic shelf according to embodiments of the present disclosure.

The shuttle vehicle conveying device of the present disclosure includes: at least two shuttle vehicle level-switching hoists; and a transverse track arranged between two adjacent shuttle vehicle level-switching hoists in the at least two shuttle vehicle level-switching hoists for the shuttle vehicle to move between the adjacent shuttle vehicle level-switching hoists, wherein the at least two shuttle vehicle level-switching hoists are configured to be provided at edges of laneways of stereoscopic shelves, and the shuttle vehicle transports an article between different levels of a same stereoscopic shelf and between different stereoscopic shelves based on a lifting and rotation of the shuttle vehicle by the shuttle vehicle level-switching hoists.

As shown in FIG. 11, the shuttle vehicle level-switching hoist is hereinafter referred to as a hoist. The shuttle vehicle conveying device of the embodiment includes: p hoists M of any one of the above-mentioned hoists arranged at intervals in a first direction, wherein p≥2; and a transverse rail 6 between two adjacent hoists in the p hoists. In the embodiment, the shuttle vehicle may be a two-way shuttle vehicle.

The above-mentioned shuttle vehicle conveying device is used to be provided at edges of q stereoscopic shelves 8, wherein q≥2. For example, in FIG. 11, q=6 is taken as an example, and p=3 is taken as an example. The corresponding three laneways are respectively described as a first laneway 7a, a second laneway 7b and a third laneway 7c from left to right.

As shown in FIG. 11, there are a total of p laneways 7 at intervals of q stereoscopic shelves 8. The setting positions of the hoists M correspond to the laneways 7 one to one, and the above-mentioned first direction has a predetermined included angle with an extension direction of the laneway 7. In the embodiment, an included angle between the first direction and the extension direction of the laneway 7 is 90° as an example. In other embodiments of the present disclosure, the above-mentioned predetermined included angle may be any angle greater than or equal to 90° and less than 180°, such as 100°, 110°, 120°, 125°, 130°, 150°, etc., and a distribution of the edges of the q stereoscopic shelves 8 changes accordingly. The edges of the q stereoscopic shelves 8 are distributed in a second direction. The second direction is parallel to a layout direction of the transverse track, that is, parallel to the first direction, and each laneway is arranged in parallel.

According to embodiments of the present disclosure, based on the rotation driving and the driving of the lifting driving member, the shuttle vehicle located on a rotatable vehicle carrying platform in a certain hoist realizes taking and placing of an article at different levels of the stereoscopic shelf on at least one side of the current laneway, and a movement between different hoists is realized based on the transverse track and the rotatable vehicle carrying platform of the certain hoist to rotate a predetermined included angle or a supplementary angle of the predetermined included angle, so as to take and place an article on stereoscopic shelves corresponding to other laneways.

The following is an illustrative description of a process of a shuttle vehicle 5 taking and placing goods based on the above-mentioned shuttle vehicle conveying device with reference to FIG. 11. The scene may be that the shuttle vehicle is unloaded to take goods, or the shuttle vehicle is loaded with goods to place the goods. As shown in FIG. 11, the shuttle vehicle 5 is now located on the transverse track 6 between the middle hoist and the right hoist, and the shuttle vehicle 5 moves to the left. Based on a cooperation of the shuttle vehicle's roller and the second guide structure 234, the shuttle vehicle 5 may move gradually from the transverse track to the vehicle carrying frame 23 of the middle shuttle vehicle level-switching hoist, and the rotary disc 212 rotates for a predetermined angle or a supplementary angle of the predetermined angle, so that the shuttle vehicle 5 may drive down into the second laneway 7b. For example, in a case of a predetermined angle of 120°, the rotary disc 212 may rotate 60° counterclockwise or 120° clockwise. For example, in a case of a predetermined angle of 90°, the rotary disc may rotate 900 clockwise or counterclockwise. On the stereoscopic shelf 8 on left and right sides of the second laneway 7b, corresponding goods are placed at different height levels. When the shuttle vehicle is still on the vehicle carrying frame 23 of the hoist, the lifting driving member 4 of the hoist may control the vehicle carrying device 2 to move in the vertical direction to a height of the level on which the goods are to be taken and placed according to a change of the level on which the goods are to be taken and placed. Next, the shuttle vehicle 5 may take and place the goods at different levels of the nearby stereoscopic shelf 8 on both sides of the second laneway 7b. Based on the above description, it may be seen that the above-mentioned hoist has both the lifting function and the rotation function, which may realize the movement of the shuttle vehicle 5 between different laneways, and the taking and placing of goods at different levels on the stereoscopic shelf.

The above-mentioned shuttle vehicle level-switching hoist has both lifting and rotating functions, and may be suitable to the two-way shuttle vehicle. The arrangement of the stereoscopic shelf and laneway matching the two-way shuttle vehicle is relatively simple, without the need to set an intersection, and a layout of the stereoscopic shelf is simple. The article transportation of the two-way shuttle vehicle between different levels of the same stereoscopic shelf and between different stereoscopic shelves may be realized.

Those skilled in the art will appreciate that features recited in the various embodiments of the present disclosure and/or the claims may be combined and/or incorporated in a variety of ways, even if such combinations or incorporations are not clearly recited in the present disclosure. In particular, the features recited in the various embodiments of the present disclosure and/or the claims may be combined and/or incorporated without departing from the spirit and teachings of the present disclosure, and all such combinations and/or incorporations fall within the scope of the present disclosure.

Embodiments of the present disclosure have been described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A shuttle vehicle level-switching hoist for a stereoscopic warehouse, comprising: a stereoscopic support frame and a vehicle carrying device for carrying the shuttle vehicle, wherein, the stereoscopic support frame is provided with a lifting driving member configured to drive the vehicle carrying device to move in a vertical direction;

the vehicle carrying device is located in the stereoscopic support frame, and the vehicle carrying device comprises a main frame structure and a rotatable vehicle carrying structure arranged in the main frame structure, wherein a support member is arranged in the main frame structure; and the rotatable vehicle carrying structure comprises:

a rotary disc arranged on the support member;

a rotation driving member arranged on the support member and configured to drive the rotary disc to rotate; and a vehicle carrying part arranged on the rotary disc and configured to carry the shuttle vehicle.

2. The shuttle vehicle level-switching hoist according to claim 1, wherein the vehicle carrying part comprises: an intermediate support member and a vehicle carrying frame;

wherein the intermediate support member is fixed on the rotary disc, the intermediate support member is provided with a displacement driving component and a first guide structure, the vehicle carrying frame is provided with a moving part matched with the first guide structure, the displacement driving component is configured to drive the vehicle carrying frame to move in an extension direction of the first guide structure, and the vehicle carrying frame is configured to place the shuttle vehicle.

3. The shuttle vehicle level-switching hoist according to claim 2, wherein the vehicle carrying frame is further provided with a second guide structure matched with a wheel of the shuttle vehicle, and an extension direction of the second guide structure is the same as the extension direction of the first guide structure.

4. The shuttle vehicle level-switching hoist according to claim 2, wherein a side edge of the vehicle carrying frame in the extension direction of the first guide structure is further provided with a wing plate.

5. The shuttle vehicle level-switching hoist according to claim 1, wherein a top corner of the main frame structure is provided with a guide wheel for fitting with the stereoscopic support frame in the vertical direction, so as to limit the vehicle carrying device to move in the vertical direction along the main frame structure.

6. The shuttle vehicle level-switching hoist according to claim 2, wherein an opening is arranged on the intermediate support member at a position other than a position where the displacement driving component is arranged, the opening being for reducing a weight of the vehicle carrying device while ensuring a strength.

7. The shuttle vehicle level-switching hoist according to claim 1, wherein the main frame structure comprises a peripheral frame and a support beam arranged on a top plane of the peripheral frame, and the support beam is configured to enhance a structural strength and protect an internal structure from being impacted by a foreign object.

8. The shuttle vehicle level-switching hoist according to claim 1, wherein the shuttle vehicle is a two-way shuttle vehicle, and the two-way shuttle vehicle is a shuttle vehicle moving in two opposite directions along a same straight line.

9. A shuttle vehicle conveying device, comprising:

at least two shuttle vehicle level-switching hoists according to claim 1;

a transverse track arranged between two adjacent shuttle vehicle level-switching hoists in the at least two shuttle vehicle level-switching hoists for the shuttle vehicle to move between the adjacent shuttle vehicle level-switching hoists;

wherein the at least two shuttle vehicle level-switching hoists are configured to be provided at edges of laneways of stereoscopic shelves, and the shuttle vehicle transports an article between different levels of a same stereoscopic shelf and between different stereoscopic shelves based on a lifting and rotation of the shuttle vehicle by the shuttle vehicle level-switching hoists.

* * * * *